Jan. 29, 1957  J. D. GORDON  2,779,092
METHOD AND APPARATUS FOR MAKING VEHICLE BODIES
Filed Dec. 26, 1951  6 Sheets-Sheet 1

FIG. 1.

INVENTOR.
JOHN D. GORDON
BY
ATTORNEYS.

Jan. 29, 1957  J. D. GORDON  2,779,092
METHOD AND APPARATUS FOR MAKING VEHICLE BODIES
Filed Dec. 26, 1951  6 Sheets-Sheet 2

INVENTOR.
JOHN D. GORDON
BY
Barnes, Kisselle, Laughlin & Raisch
ATTORNEYS.

INVENTOR.
JOHN D. GORDON

Jan. 29, 1957  J. D. GORDON  2,779,092
METHOD AND APPARATUS FOR MAKING VEHICLE BODIES
Filed Dec. 26, 1951  6 Sheets-Sheet 4

INVENTOR.
JOHN D. GORDON
BY
*Barnes, Kisselle, Laughlin & Raisch*
ATTORNEYS.

Jan. 29, 1957  J. D. GORDON  2,779,092
METHOD AND APPARATUS FOR MAKING VEHICLE BODIES
Filed Dec. 26, 1951  6 Sheets-Sheet 5

INVENTOR.
JOHN D. GORDON
BY
ATTORNEYS.

Jan. 29, 1957   J. D. GORDON   2,779,092
METHOD AND APPARATUS FOR MAKING VEHICLE BODIES
Filed Dec. 26, 1951   6 Sheets-Sheet 6

INVENTOR.
JOHN D. GORDON
BY
ATTORNEYS.

United States Patent Office 2,779,092
Patented Jan. 29, 1957

2,779,092
METHOD AND APPARATUS FOR MAKING VEHICLE BODIES

John D. Gordon, Detroit, Mich., assignor to Progressive Welder Sales Company, Detroit, Mich., a corporation of Michigan Application December 26, 1951, Serial No. 263,411

10 Claims. (Cl. 29—430)

This invention relates to a method of making automobile or other types of bodies and relates particularly to a method of assembling and joining the various structural and external parts of the body to make it ready for welding and the final stages of fabrication.

At the present time, it is common to assemble the various body parts in mass production on a plurality of body bucks; that is, stations where equipment is designed to locate the parts relative to each other, after which welders at that station will partially weld the parts together and the body will be moved progressively to other stations where other welders will complete the welding.

This method has had the disadvantage that it was impossible to really square the body with the chassis frame upon which it would be located until these two parts were assembled together. It was then necessary to shim up the body with respect to the chassis in order to prevent the development of squeaks and strains. Also, in this previous method it was necessary to have a large number of welding stations, many of them exact duplicates for each style body, which meant more welding equipment and more manpower to handle the work.

In this previous method the space required for each body assembly was about four times the body area since it is necessary to have storage space directly adjacent the framing buck for the side parts and roof of the body. These parts were carried to the assembly buck by workmen provided for that purpose and additional workmen of the mechanics class were required to manipulate the welding equipment necessary to the assembly location. With this arrangement it would be too complex to be practical to have a conveying system for the parts to be assembled together at the several stations. The fact that so many workmen are in such a confined area results in gross inefficiency and delays on waiting for others to clear their interference.

In addition, the storage space required at these assembly spots is extremely critical space, costing twice as much as ordinary storage space in a non-production plant area. Additional cost is attributed to longer lead and connecting lines required for electric welding current, operating air pressure and cooling water required for these several assembly stations all spaced apart by the large storage and working spaces required.

The present system to be disclosed here contemplates the assembly and welding of body parts on a completely synchronized set of moving lines which will enable the manufacturer to reduce and distribute the floor space required for the operation and to control the speed of the line in accordance with requirements. Thus, a manufacturer can control accurately the body production since the bodies will be moving progressively at a predetermined, adjustable rate. Production is being synchronized and maintained since each operation must be performed successively on each of the continuous moving lines as each particular assembly moves past the station assigned to that operation.

With the use of co-ordinated moving lines, the process of manufacture consists of providing a main assembly and welding line to which other supply lines are co-ordinated. The main starting base for a "gate line" is a moving body truck structure which is conveyed down the main assembly line by a conveyor drive. The body floorpan assemblies are fastened to this truck on regular body mounting holes which are the same ones which will be used to bolt the body to the chassis frame. With these floorpan assemblies securely located, welding tools are used to permanently join them together as a complete floorpan assembly. Meanwhile, similar action is taking place with the parts composing the side assemblies, that is, all side parts are brought to the moving side assembly fixtures called "side gates" located, and welded into an assembly. These side gates move on auxiliary lines (one line for left-hand side assembly, and one line for the right-hand side assembly) which converge with the main body truck line, where they are rigidly attached temporarily to the main body truck. This now makes an assembly of the floorpan assembly and the left- and right-hand side assemblies.

Co-ordinated with the previously described lines is a third conveyor line which delivers a roof panel assembly in a fixture overhead to converge with the sides and floorpan. This fixture and roof panel assembly are securely attached to the side gates, now making a fully enclosed framing fixture having the roof, sides and floorpan perfectly aligned and clamped.

In similar fashion, a windshield framing fixture and its windshield panels, cowl top, etc., and a rear luggage compartment and rear window framing fixture with their corresponding body parts, are securely attached to the previous fixtures and parts.

Along this line, welding equipment together with air and water lines can be properly located without being concentrated in one congested area, since the progressively assembled body will move along the line where specific types of welding equipment can be provided at co-ordinated points to weld the various parts together. As soon as the parts are welded together, the side gate fixtures, roof conveying fixtures, and front and rear fixtures can be removed and returned to loading stations away from the welding area.

In this manner it will be seen that the parts storage can be in an area different from that where welding men are operating. In this method the progress of the body is never stopped or slowed. Since thousands of welds are necessary on a vehicle body, it will be seen that the task of completing all the welding operations is co-ordinated into a smooth, efficient, synchronized system which eliminates the usual bottlenecks and delays of former methods.

Another great advantage of this arrangement is the fact that all body types can be assembled and welded in the same system. It is now possible to produce as many combinations of four-door cars, two-doors, coupes, convertibles, hard-top convertibles, etc. as required by merely synchronizing the mating of the side gate fixtures and parts with the proper other fixtures and parts. Any mix of body types can be assembled and welded in the same system, in any sequence desired.

In addition, the present invention contemplates the use of the moving rigid truck member to simulate the chassis frame for locating the body parts as they are assembled in constant relation to fixed mounting holes so that uniform bodies will be produced which will perfectly match any chassis on which they will be mounted. In addition, the necessary welding equipment can be reduced materially since this system will eliminate duplication of equipment which is necessary in regular body bucks— one buck to a body style. The welding tools are much more efficiently selected and utilized. The number of men required to assemble and weld bodies in production by this system is about 50% of that previously required in stationary buck systems. In previous body manufacturing methods, the body parts themselves have been used as locating points. With this proposed system, the rigid chassis truck serves as a positive set of reference holes to co-ordinate all parts. Thus, if a body part does not properly fit with the rest of the assembly, it will not be used. By previous methods the selection of mating parts was not possible since there were no such basic points of reference.

Other objects of this invention, in addition to the general system, include the co-ordination of, and the special conveying mechanism for, the various parts assemblies of the body as they are converged into the final assembly, special clamping units, base truck fixture and other fixtures cooperating therewith for use in the construction, and an overall clamping arrangement which positively locates all mating jointures of the body with respect to the novel supporting truck which is conveyed along the line in the assembling and welding operation.

Other objects and features of the invention relating to details of construction and operation will be evident in the following description and claims.

Drawings accompany the specification, and the various views thereof may be briefly described as.

Figures 2, 3, 4, 5:
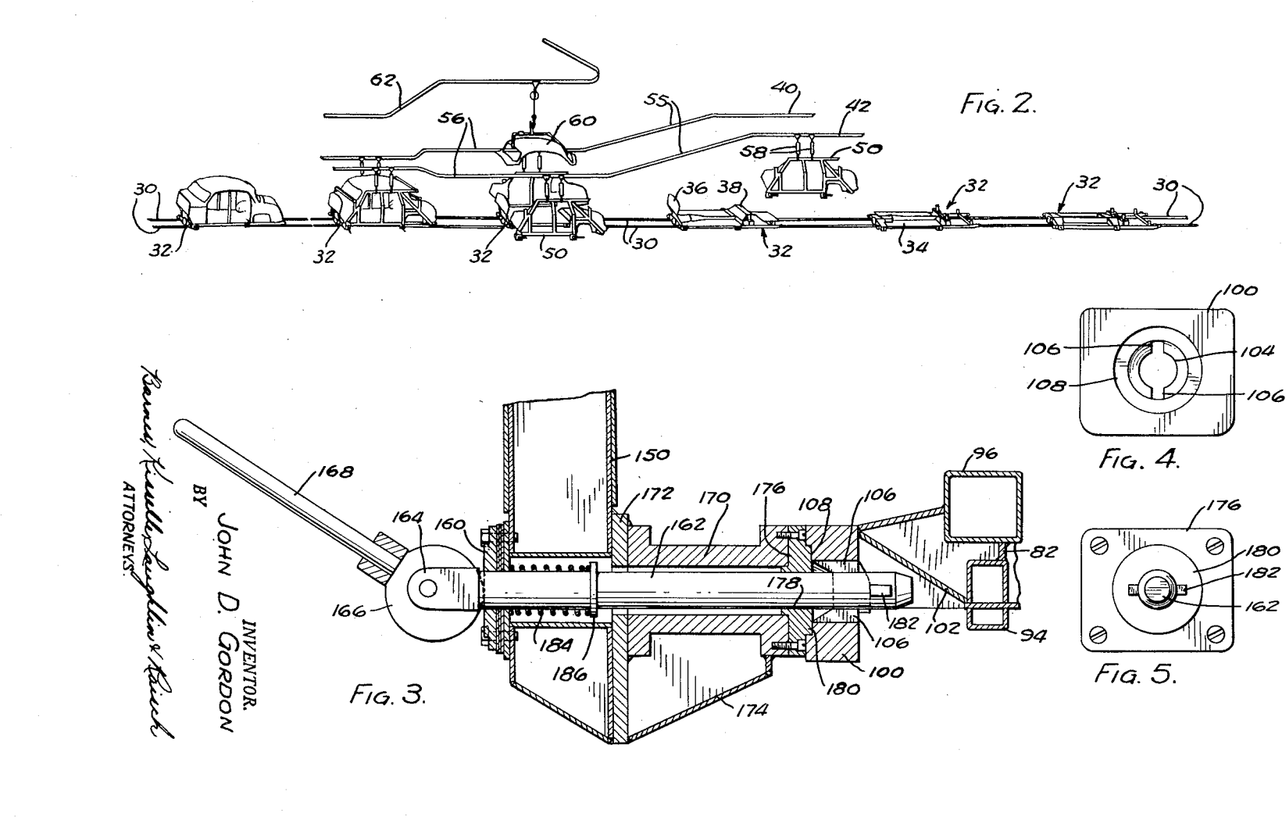
Figure 2, a perspective view showing the general relation of the parts in the system.
Figure 3, a sectional view of a side gate clamp taken on line 3—3 of Figure 1.
Figure 4, an elevation of a clamping socket on the body assembly truck.
Figure 5, an elevation of the facing plate and locking pin of the side gate.

Referring to Figure 2, the main steps of the system will be first described and then the details of the apparatus will be reviewed. In Figure 2, tracks 30 are shown extending along a production line and on these tracks are conveyed body assembly trucks 32. The truck 32 at the extreme right-hand end of the drawing is empty. The next truck bears a front floor pan 34, and on the third truck there has been added to the floor pan a dash panel or firewall 36 and a rear floor pan 38. These parts are then welded together.

Above the tracks 30 are two conveyor rails 40 and 42, each of which is intended to transport side gate loading fixtures 50, upon which are loaded and welded side panel assemblies which consist of parts which will be detailed later, including a rocker panel, front side cowl, front pillar, center pillar, rear pillar, and rear quarter assembly which includes the inner and outer wheel housing and fender.

It will be seen that the conveyor rails 40 and 42 converge at 55 to a level 56, in which area the suspending means 58 holding the side panel gate assemblies corresponds with the proper position relative to the assembled floor pan. In this position the side gates 50 are clamped to the truck 32, a top member 60 is dropped in place from a supporting rail 62, and then front and rear window framing fixtures are attached and clamped, after which all of the clamping parts and sub-locating units are fastened to the truck 32 and the other related parts and all of the body parts are assembled. The body is then ready for welding, after which the side gates and other positioning fixtures are removed and the body continues forward while bolted to the assembly trucks 32 moving on the tracks 30 for additional operations, such as metal finishing, phosphate coating, prime, paint, and trimming.

Figure 8:
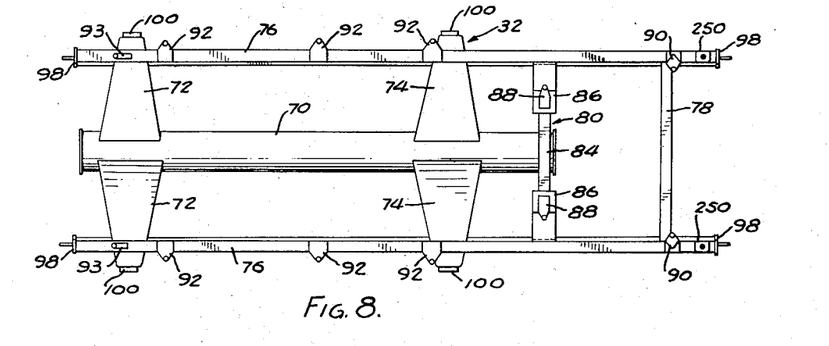
Figure 8, a plan view of a body assembly truck.
Figures 9, 10:
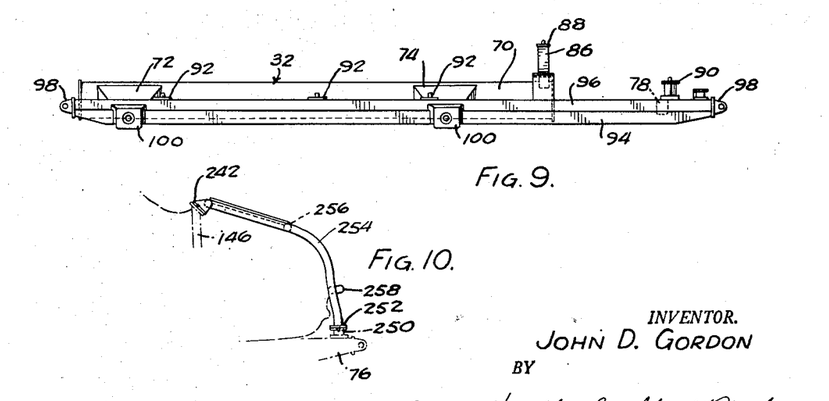
Figure 9, a side view of the body assembly truck.
Figure 10, a side view of a rear deck fixture.

The main element of the assembly unit is the truck member designated broadly as 32 and shown in greater detail in Figures 8 and 9. One preferred construction for the body assembly truck has a very stiff backbone member in a tube 70, which may be called a torque tube, having about 10 inch diameter. Outriggers 72 and 74 extend outwardly from this tube on each side at the forward end and adjacent the rear end and connect two side rails 76 which are also connected at the back end by a stringer 78 and at the rear end of the tube 70 by a raised connecting construction 80.

The outriggers 72, 74 are formed from steel plates welded together with suitable stiffeners 82 (Figure 3). The outriggers are closed on the top and bottom and at the sides by stiff metal plates welded together, and the stiffeners are interposed between these plates to reinforce the same. At the rear end of the pipe 70 a square tube 84 connects the side rails 76 and is rigidly fastened thereto. Two short columns 86 rise from this tube to support brackets 88 which co-operate with the bottom of the vehicle body to position the same. Other positioning brackets on the bottom frame are shown at the rear at 90 and at the sides at 92 and at the front at 93.

The sides 76 are formed of a main rectangular section tube 94 and a square section tube 96 joined throughout their length by the plates of the outriggers (Figure 3) and by end plates 98. The relationship of these tubes is shown in Figure 3. The stringer 78 is a rectangular tube which connects the side tubes 96.

At the ends of the outriggers as they project through the tubes 94 and 96 is mounted a clamp locator block 100 which is fastened to the top and side plates of the outrigger at the end edges. The bottom plate of the outrigger connects to a gusset 102, Figure 3, which joins the plates and the block 100. The block 100 has a circular central hole 104 with upper and lower opposed radial slots 106. A circular recess 108 surrounds the hole 104.

It will be seen that the truck construction, with the outriggers and the side tubes being formed in rectangular section and joined rigidly together, is extremely resistant to torsional deformation, much more so than an automobile frame. Consequently, bodies built up on this truck can be accurately assembled.

The torque-tube construction is especially adapted to present-day vehicle construction in which drive shaft recesses are provided in the floor pans. The torque tube is received in these recesses, permitting the assembly to be placed very low relative to the working floor space. With one guide track centrally of the truck and supporting casters running on flush floor beams, the floor is kept reasonably free of obstructions. These truck constructions may necessarily vary with the particular vehicles but must be resistant to torsion as described.

Figure 1:
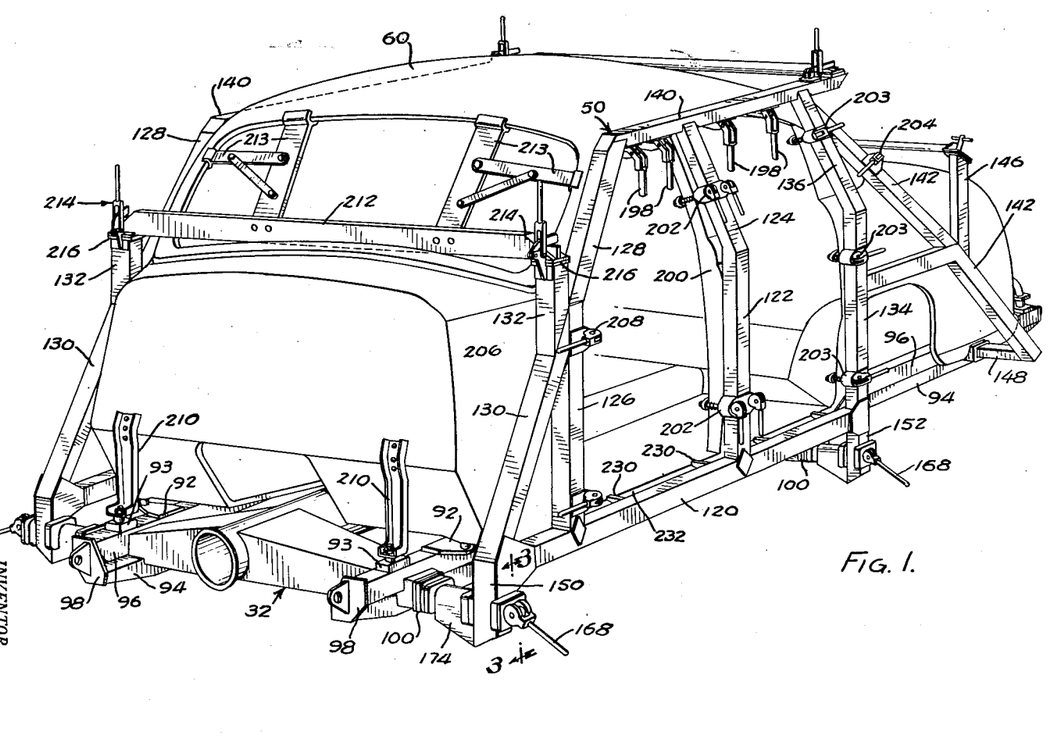
Figure 1, a perspective view showing a body assembled ready for welding.
Figure 6:
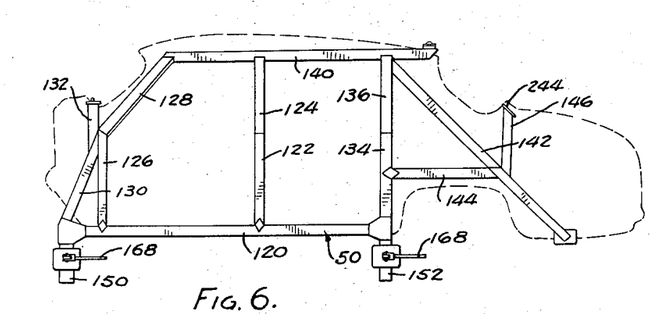
Figure 6, a side elevation of a side gate.
Figure 7:
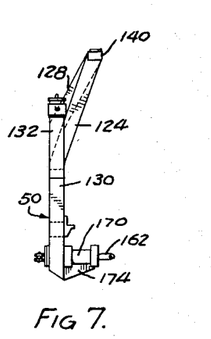
Figure 7, an end elevation of a side gate.

The second main elements of the assembly device are the side gates 50 which are adapted to be mounted on and to take their vertical position from the supporting truck. Figures 1 and 6 show these side gates to best advantage.

One embodiment of these gates is formed of heavy metal tube with rectangular cross section to resist torsional strains. The main elements of the exemplary side gates shown in the drawings consist of a bottom tube 120 which parallels the rocker panel 232 of the body assembly, a center pillar which is formed of a vertical riser 122 and an angled riser 124, a front pillar which is formed of a vertical riser 126 and an angled riser 128 together with a reinforcing forward tube 130, and a short riser 132 which will mount a forward cross tie later to be described, a rear pillar member consisting of a vertical riser 134, and an angled riser 136. All of the pillar members connect to a roof bar 140.

At the rear of the gate a member 142 angles down from the roof bar to the bottom of the rear quarter position reinforced by a horizontal tube 144, at the end of which a riser 146 extends upwardly to support a rear cross tie, later to be described. An inward extension 148, Figure 1, is positioned at the bottom of the member 142.

At the bottom of pillar 130 is a short vertical extension 150, and at the bottom of the pillar 134 is a short downward extension 152 on which are mounted clamps to fasten the side gate to the body truck. A sectional view on line 3—3 of Figure 1 shown in Figure 3 illustrates the nature of this clamp. A front plate assembly 160 supports the outer end of a clamp bar 162 which has a clevis 164 at the outer end to receive a cam 166 operated by a lever handle 168.

A flanged tube 170 is fastened to a back plate 172 mounted on the tube 150, this back plate being thoroughly reinforced from the tube 150 and to the rear end of the tube 170 by an enclosing plate housing 174. On the rear flange of the tube 170 is a steel surface plate 176 bolted to the flange and having a central hole 178 to mount the rear end of the clamp bar 162.

A circular projection 180 is received by the circular recess 108 on block 100. The inner end of clamp bar 162 has lugs 182 adapted to pass through the slots 106 and lock behind the block 100. A spring 184 acting on a retaining collar 186 urges the bar 162 inward. It is preferred that the total area of the block 100 and the facing plate 176 be approximately 30 square inches to provide an adequate squaring surface for the side gate.

The rugged construction of the clamp allows a great deal of pressure to be applied to the side gate at the clamping points to maintain it in a stable vertical position.

On the side gate are a number of clamps used to clamp the members of the sides of the vehicle together. Some of these clamps are of the cam type as shown in Figure 15 and others are what are called overcenter clamps or toggle clamps, as shown in Figure 14.

Figures 14, 15, 16, 17:
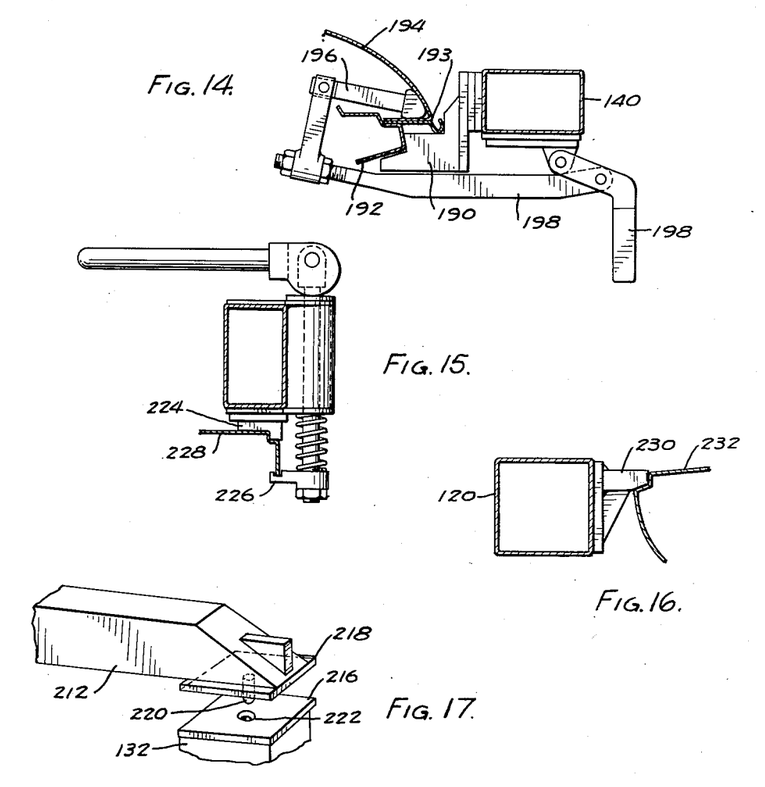
Figure 14, a side view of a roof rail clamp.
Figure 15, a top view of a side clamp.
Figure 16, a sectional view showing the relationship between the bottom of the side gate and the sill of the vehicle.
Figure 17, a detailed view of a front cross tie member and its relationship to the side gate.
Figure 18:
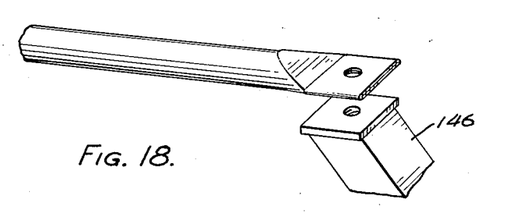
Figure 18, a sectional view of the rear cross tie member and its relationship to the side gate.

In Figure 14, for example, the top gate member 140 is shown having a supporting bracket 190 shaped to receive the edge of the roof rail 192 together with a drip molding 193 and the edge of the roof 194. A toe member 196 on clamp arm 198 holds all of these parts in position when the clamp actuating arm 198 is swung to the position shown. There are four such clamps shown along the roof rail (Figure 1).

The center pillar of the assembly indicated at 200 is held in place by double cam clamps 202 mounted on members 122 and 124 of the gate. The rear pillar of the side assembly is clamped with cam clamps 203 which also hold the rear quarter assembly in position in conjunction with the positioning member 148. A cam clamp 204 serves as a positioner for the lower end of the roof. At the front pillar of the assembly behind the cowl 206 is a clamp 208 which stabilizes this portion of the assembly.

As the assembly is shown in Figure 1, it will be seen that the supporting brackets 210 are located on the locator pins 93 fastened at the bottom of the dash panel. A front cross tie member 212 with front window clamps 213 extends between pillars 132 and is clamped to the top of these pillars by cam clamps 214. It is desirable to have plates 216 and 218, respectively, on the pillars 132 and on the cross tie members 212 rigidly fastened to these members so that the clamping device can press these plates closely together, affording another relatively large area for stabilizing the side members with respect to each other. A pin 220 locates in a hole 222 for positive positioning (Figure 17).

Another type of side clamp is shown in Figure 15 wherein a pad member 224 is mounted on a gate pillar and a clamping arm 226 holds a portion of the body 228. In some cases it is desirable to assemble side parts of the vehicle on these side gates and weld them together in transit toward the main truck. This system will be referred to later.

At the front of the unit, as shown in Figure 1, there are ten positioning points, two at the blocks 93, two at the block 100, four at clamps 213, and two at the clamps 214. The bottom sill which parallels the rocker panel of the side has inward projections 230 (see Figure 16) which co-operate with the sill of the body 232 to stabilize this portion of the bottom.

Figure 11:
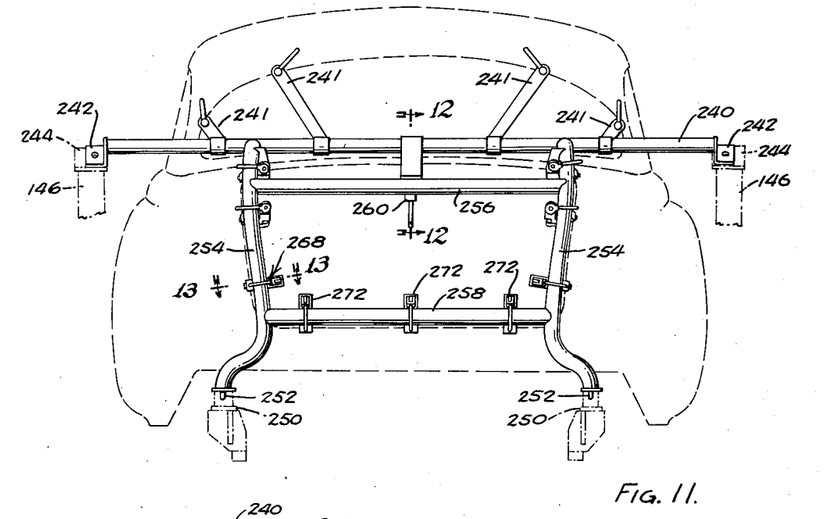
Figure 11, a rear view of the aligning and positioning mechanism for the body parts.

Referring now to the back support of the assembly, attention is directed to Figure 11 where the pillars 146 of the side gate assembly are shown in dotted lines. Associated with these pillars is a rear tie bar 240 having clamps 241 for the margins of the rear window and side plates 242 adapted to co-operate with a cap plate 244 on the upright pillars. Suitable cam clamps would be used to move these plates together as was done in connection with the floor tie bar. At the rear end of the truck two stabilizing sockets 250 are shown to receive studs 252 projecting from the bottom of side arms 254 on a rear deck lid fixture. These side arms 254 are connected at the top to the rear tie bar 240 and are also rigidly associated with two cross bars 256 and 258 positioned in parallel relation between the arms 254.

Figure 12:
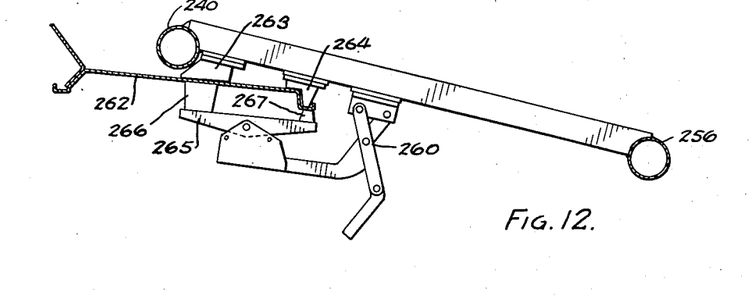
Figure 12, a sectional view of a rear deck clamp taken on line 12—12 of Figure 11.
Figure 13:
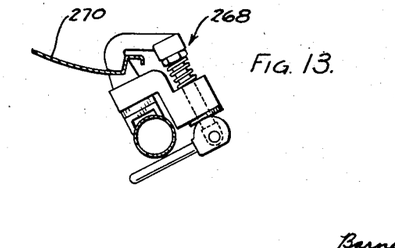
Figure 13, a side view of an edge clamp taken on line 13—13 of Figure 11.

A clamp shown in Figure 12 at 260 is used to associate the rear deck panel 262 with the fixture. This clamp has two pad sections 263 and 264 associating with a centrally pivoted pad arm 265 having pressure members 266 and 267. On the side arms 254 are clamps 268 shown in Figure 13 which clamp the edges of the rear deck opening 270 which also form a part of the rear quarter assembly and thus position the entire rear quarter assembly of the side. Clamps 272 on bar 258 will position the lower edge of the rear deck opening. Thus, at the back of the vehicle there are two positive positioning points 250 and also two positioning points 242 relating to the side gates.

As shown in Figure 2, the trucks 32 are on guide tracks and are conveyed continuously from station to station as previously described. The gates 50 are on tracks 55 and can be loaded remotely from the point of final assembly and sent forward to the point of convergence and welding. After the gates are assembled to the truck and all parts are clamped together, the assembled body with gates and truck may be moved ahead from station to station in intermittent or in continuous motion where separate welding operations can be performed. Thus welding guns for each operation may be specialized and each operation can be timed accurately. When the body is welded so that the supporting gates may be removed, the gates may be returned on conveyor tracks to a point of storage.

Thus, a progressive system of welding is obtained which will be under controlled movement at all times and a body can be produced which will have constantly maintained specifications. This system takes the piecework out of body assembly and enables the manufacturer to depend on regular output.

Figure 19:
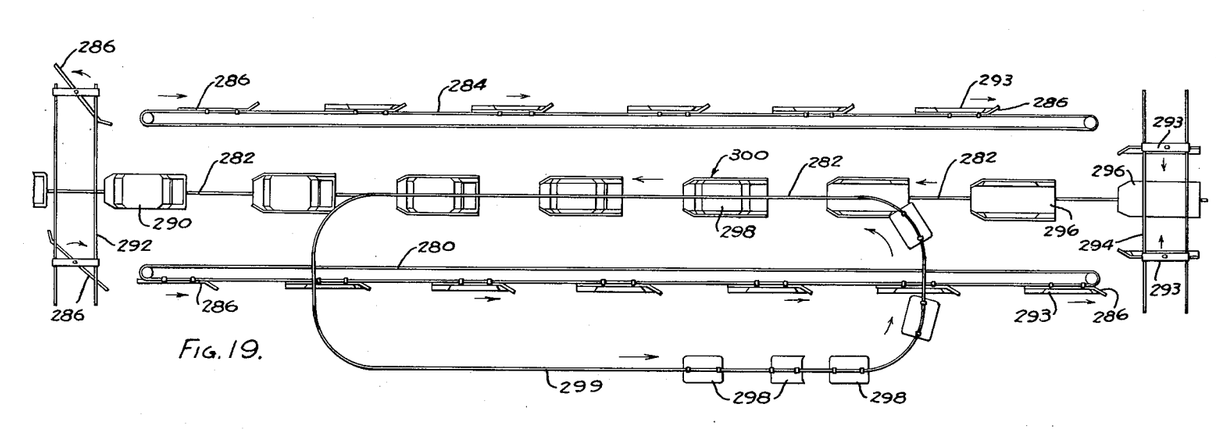
Figure 19, a plan view of a conveyor system.
Figures 20, 21:
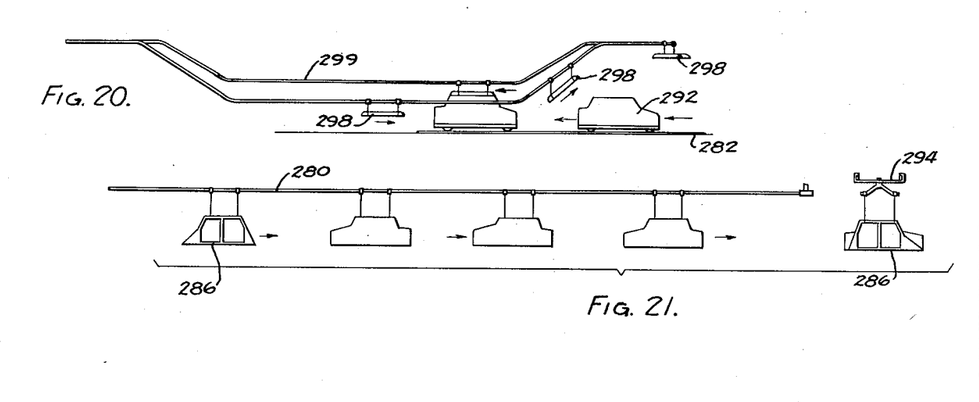
Figure 20, an elevation of a portion of Figure 19.
Figure 21, an elevation of a side assembly.

In Figures 19, 20 and 21 a schematic presentation is illustrated showing the completed concept of the overall plan of body assembly.

In Figure 19 a continuous conveyor track 280 is positioned on one side of a body conveyor track shown diagrammatically at 282. On the other side of the main body conveyor is a continuous side gate conveyor track 284. Side gate units 286 are removed from the completed body 290 and placed on a cross storage track 292. From here they can be turned and replaced onto the outer run of the conveyors 280 and 284.

As they proceed in the direction of the arrows down toward the other end, they pass assembly areas where the side portion of the body assembly is completely assembled and welded by the time the side gate reaches the position indicated at 293.

The completed side assembly 293 together with the side gate may be then put on cross tracks 294 which may be used for storage purposes and which also convey the complete side assemblies toward the truck mounted floor pan 296. From here the gate assemblies are fastened to the truck mounted floor pan and moved along the conveyor shown schematically at 282, the various parts of the body being assembled as previously described.

For example, the body tops 298 are conveyed on a track 299 and reach a station 300. The welding then continues as described in connection with the previous figures until the body is completed as shown at 290. The side gates or frames are then removed and started on the return trip, where they again pick up a new side assembly.

It will be seen, therefore, that as shown in Figures 19 to 21 all of the welding equipment of a plant for body assembly can be concentrated in a single area, making it possible to consolidate bus bar and transformer installations.

It is also possible to have practically continuous assembly, using the side gate assembly traveling in the direction opposite to the direction of motion of the body.

The term "reference surfaces," used in the claims, covers such terms as "reference holes," "locator blocks," "squaring surfaces," "stabilizing plates," "positioning points," "cap plates," and the like, that are used in the specification. The term "vertical boundary portions of the truck fixture" used in the claims, covers such structure as the sides and/or ends of the truck fixture.

What I claim is:

1. A method of assembling vehicle bodies at minimum production costs, which comprises, providing a rigid base truck member to receive a floor and seat support panels of a vehicle, providing on said truck member a plurality of reference surfaces, moving a plurality of said truck members in one direction on a main conveyor at a predetermined rate while assembling said panels, providing side gate frames for the progressive assembly and welding of parts of the side of the vehicle, and providing on said frames a plurality of reference surfaces to interengage with reference surfaces on said truck members, moving a plurality of side gate frames in one direction past assembly stations, transferring the completed side gate assembly and frame to said truck members while joining said interengaging reference surfaces in locked relation, lowering a top panel and a rear panel on said assembly, applying locating devices to said top and rear panels, providing reference surfaces on said locating devices cooperable with reference surfaces on said side gate frames whereby all parts are positioned in predetermined relation relative to said truck member, and joining said vehicle body parts in assembled relation as said truck, side gates and locating devices move toward a discharge station.

2. The method of producing a body for a vehicle which comprises the step of moving a plurality of body floor support trucks in one direction on a main conveyor at a rate determined by production factors, such as unit costs, worker availability and accessibility of parts, providing a plurality of feeder lines for main body parts, assembling floor and seat support panels on said truck, providing a plurality of side gate frames and assembling thereon progressively the various parts of the side of a vehicle, converging said side gate frames with each side of said main conveyor, providing reference surfaces on said trucks and said gate frames, assembling said trucks and frames together with said reference surfaces interengaged, moving a top assembly unit for a vehicle into position relative to said side gates, and providing locating devices fore and aft of said assembly having reference surfaces co-operable with said side gate frames to locate said top with respect to said truck, and fastening said parts together as the full assembly moves toward a discharge station.

3. A vehicle body assembly apparatus comprising a movable, rigid, truck member to serve as a basing fixture for all body parts in assembly and having great resistance to horizontal and torsional movement, said truck member comprising a large, longitudinally extending, central tube, outrigger members extending from each end of said tube on opposite sides thereof, side rails rigidly connecting said outrigger members at each side of the tube and rigidly connected together at their ends, reference surfaces on said truck member to position the vehicle body assembly with respect thereto comprising solid clamp blocks rigidly mounted on the outrigger member ends to extend in a plane at right angles to the plane of the truck member, side gate members rigidly attachable to the opposite sides of the truck member to locate all body side assemblies including front cowl, front, center and rear pillars and the rear quarter assembly, clamping means at the bottom of each of said gate members to cooperate with the clamp blocks on the outrigger ends to rigidly attach the gate members to the truck member, said clamping means each having a first block to abut said outrigger mounted clamp blocks and means to draw said blocks together in tight relation, and front and rear cross tie members for connecting rising pillars on said gate members, each tie member having a flat reference surface at each end to cooperate with flat reference surfaces on said gate member pillars to establish rigidity to the truck and gate members in their assembled positions in addition to that furnished by the outrigger block clamps.

4. A vehicle body assembly apparatus as defined in claim 3 in which a rigid rectangular frame associates said rear tie member with the rear of the truck member, and clamping means on said frame for clamping the rear quarter of a vehicle body and the connecting portions of a rear deck enclosure in assembled relation for welding.

5. An apparatus for assembling vehicle bodies in a progressing line assembly system which comprises a rigid base truck member with means simulating the mounting points of a chassis and having great resistance to torsional displacement, side gate members adapted to be rigidly fastened to the sides of said truck member and to receive their vertical position from said truck member, said side gate members each being adapted to carry, prior to their assembly to the truck member, the side assembly of a vehicle consisting of a side cowl member, rocker panel, front, center, and rear pillars, and a rear quarter assembly consisting of inner and outer wheel housings and a fender, said side gate members being composed of rectangular tube members adapted to parallel said rocker panel and said pillars and connected at the top by a horizontal roof clamping bar, clamping means carried by the truck member and the side gate members to fasten these members in rigid association to position all parts relative to the truck member prior to welding, said side gate members each including vertical pillars at the front and rear thereof, front and rear tie members connected between said pillars of each side gate, said pillars and said tie members having complemental surfaces, and clamping means to associate said complemental surfaces in tight relation to establish rigidity to the truck mounted side gates in addition to that furnished by the clamping means connecting the gate members and the truck.

6. A method of making vehicle bodies which comprises mounting a body floor pan structure or body structural means on a movable, rigid, base truck fixture and moving the floor pan carrying truck fixture along an assembly line, said truck fixture having a plurality of reference surfaces thereon including first floor pan positioning reference surfaces and second side gate fixture positioning reference surfaces adjacent vertical boundary portions of the truck fixture, mounting body side structures on a pair of movable, rigid, side gate fixtures that have a plurality of reference surfaces thereon including side gate fixture positioning reference surfaces at the bottom portions thereof, moving the body side structure bearing side gate fixtures into opposed relationship alongside the truck fixture and rigidly fastening the truck fixture and side gate fixtures together in vehicle body assembled relationship with said second side gate positioning reference surfaces of the truck fixture in aligned engagement with said reference surfaces at the bottom portions of the side gate fixtures to accurately position the body side structure relative to the truck fixture, mounting front end and rear end body structures between the fixture carried body side structure with portions of the front and rear end body structures positioned by reference surfaces on certain of said fixtures, rigidly interconnecting certain of said plurality of reference surfaces on the opposed side gate fixtures adjacent the front and rear end portions of the truck fixture, and joining the aforesaid body structures together while in their fixture-aligned, assembled, positions.

7. A method of assembling and joining body structures to form a vehicle body which comprises constructing a body floor structure on a movable, rigid, truck fixture and moving the floor structure bearing truck fixture along an assembly line, said truck fixture having a plurality of reference surfaces thereon including first floor structure aligning reference surfaces and second side gate fixture aligning reference surfaces adjacent vertical boundary surfaces of the truck fixture, constructing body side structures on a pair of movable, rigid, side gate fixtures and moving the side structure bearing side gate fixtures into opposed relationship alongside the truck fixture, said side gate fixtures having a plurality of reference surfaces thereon including reference surfaces at the lower portions thereof, rigidly fastening the truck fixture and side gate fixtures together in vehicle body assembled relationship with said second reference surfaces of the truck fixture engaged with certain of said reference surfaces at the lower portions of the side gate fixtures to accurately position the body side structures relative to the truck fixture, mounting a body top structure on the fixture mounted body structure parts with portions thereof positioned by reference surfaces on certain of said fixtures, mounting front end and rear end body structures between the fixture mounted body side structures with portions thereof positioned by reference surfaces on certain of said fixtures, rigidly interconnecting reference surfaces on the opposed side gate fixtures adjacent the front and rear end portions of the truck fixture, and joining the aforesaid body structures together while in their fixture-aligned, assembled, positions.

8. A method of making bodies which comprises mounting a body floor member on a movable, rigid, truck fixture and moving the truck fixture with the mounted floor member along an assembly line, said truck fixture having a plurality of reference surfaces thereon including first floor member positioning reference surfaces and second side gate fixture positioning reference surfaces adjacent vertical boundary portions of the truck fixture, mounting body side structures on a pair of movable, rigid, side gate fixtures that have a plurality of reference surfaces thereon including reference surfaces adjacent bottom portions of each side gate, moving the body side bearing side gate fixtures into opposed relationship alongside the truck fixture and rigidly fastening the truck fixture and the side gate fixtures together in vehicle body assembled relationship with said reference surfaces at the bottom portions of the side gates in aligned engagement with said second reference surfaces of the truck fixture to accurately position the body side structures relative to the truck fixture, mounting a body top structure on the aforesaid fixture mounted body structures with portions thereof positioned by reference surfaces on certain of said fixtures, rigidly interconnecting reference surfaces on the opposed side gate fixtures adjacent the front and rear end portions of the truck fixture, aligning portions of the body top structure with certain of the reference surfaces on certain of the interconnected fixtures, and joining the aforesaid body floor member and body structures together while they are held in their fixture-aligned, assembled, positions.

9. A method of making vehicle bodies which comprises mounting a body base member on a movable, rigid, truck fixture having first reference surfaces thereon with which said body base member is aligned, said truck fixture also including second surfaces located adjacent the sides thereof, mounting body side structures on a pair of rigid, movable, side gate fixtures having a plurality of reference surfaces thereon including reference surfaces adjacent the bottom thereof, moving the side gate fixtures with the side structures mounted thereon into opposed relationship alongside the truck fixture and fastening the truck fixture and side gate fixtures together in vehicle body assembled relationship with the reference surfaces at the bottom of the side gate fixtures engaged with the said second reference surfaces on the truck fixture to accurately position the body base member and the body side structures relative to the truck fixture, mounting a body top assembly, having depending front and rear end transversely extending body side structure connecting portions, on the fixture mounted body side structures with portions thereof aligned with reference surfaces on certain of said fixtures, clamping the body base member, the body side structures and the body top assembly in assembled positions aligned with respect to certain of the aforementioned fixture carried reference surfaces, and joining the assembled body base member, side structures and top assembly together while in their fixture-aligned, assembled positions.

10. A vehicle body assembly apparatus for use in a progressive assembly line operation comprising a rigid, movable, base truck fixture provided with a plurality of body positioning reference surfaces including first floor member positioning reference surfaces and second side gate positioning reference surfaces adjacent vertical boundary portions of the truck fixture, a pair of movable, rigid, side gate fixtures having means to receive and retain body parts adapted to be mounted thereon, said side gate fixtures each including first reference surfaces at the bottom portions thereof and second reference surfaces adjacent the upper portions of the side gate fixtures, means for rigidly and detachably mounting the side gate fixtures on the truck fixture with the reference surfaces on the bottom portions of the side gate fixtures rigidly engaged with said second reference surfaces of the truck fixture to accurately position the side gate fixtures and the body parts adapted to be mounted thereon in accurate alignment with respect to the truck fixture, means for rigidly interconnecting said second reference surfaces on the opposed side gate fixtures to stabilize the side gate fixtures in their erected positions on the truck fixture, and retaining means operatively associated with at least certain of the fixtures to hold the body parts adapted to be mounted on the truck fixture and side gate fixtures in rigid, aligned relationship with respect to the truck fixture.

(References on following page)

References Cited in the file of this patent

UNITED STATES PATENTS

| | | | |
|---|---|---|---|
| 823,781 | Hodgson | June 19, | 1906 |
| 1,750,130 | Romine | Mar. 11, | 1930 |
| 1,772,735 | Romine | Aug. 12, | 1930 |
| 1,876,759 | Romine | Sept. 13, | 1932 |
| 1,877,653 | Fageol | Sept. 13, | 1932 |
| 2,054,572 | McKenna | Sept. 15, | 1936 |
| 2,147,800 | Sadowski | Feb. 21, | 1939 |
| 2,176,192 | Widman | Oct. 17, | 1939 |
| 2,325,862 | Jepson | Aug. 3, | 1943 |
| 2,374,894 | Pioch | May 1, | 1945 |
| 2,383,225 | Sorensen | Aug. 21, | 1945 |
| 2,383,503 | Landis | Aug. 28, | 1945 |
| 2,389,907 | Helmuth | Nov. 27, | 1945 |
| 2,405,544 | Anjeskey | Aug. 13, | 1946 |
| 2,466,367 | Braun | Apr. 5, | 1949 |
| 2,488,978 | Julien | Nov. 22, | 1949 |
| 2,561,098 | Cole | July 17, | 1951 |